No. 840,933. PATENTED JAN. 8, 1907.
C. A. GONZENBACH.
EMBROIDERING MACHINE.
APPLICATION FILED APR. 28, 1906.

7 SHEETS—SHEET 1.

No. 840,933. PATENTED JAN. 8, 1907.
C. A. GONZENBACH.
EMBROIDERING MACHINE.
APPLICATION FILED APR. 28, 1906.

7 SHEETS—SHEET 3.

Witnesses:
L. Lee.
Raison D. Purrington

Inventor,
Charles A. Gonzenbach,
per Thomas S. Crane, Atty

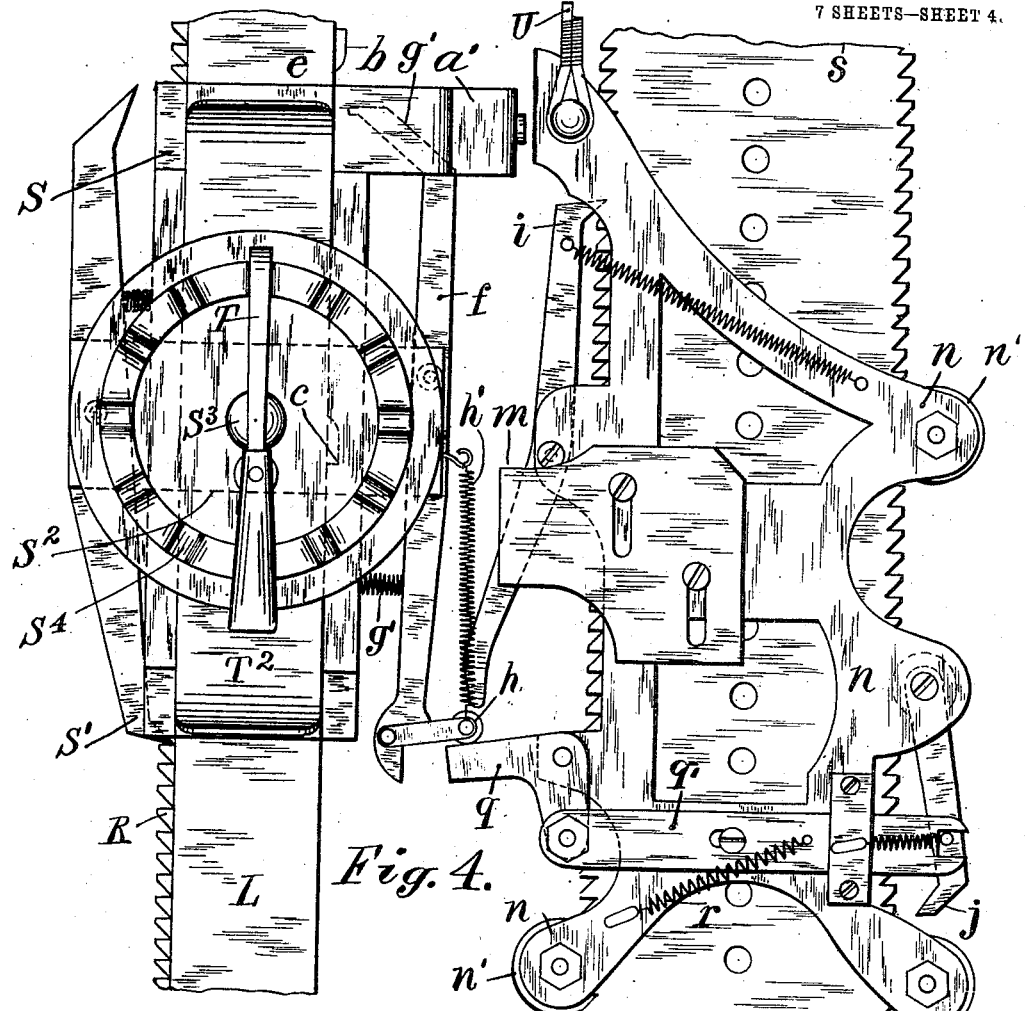
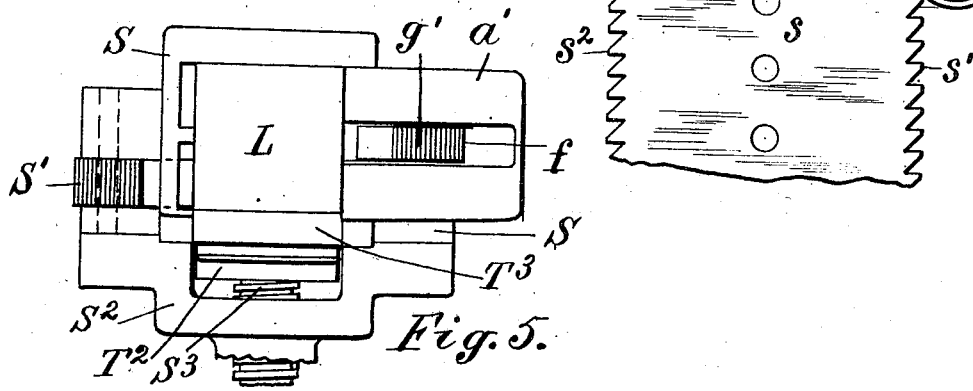

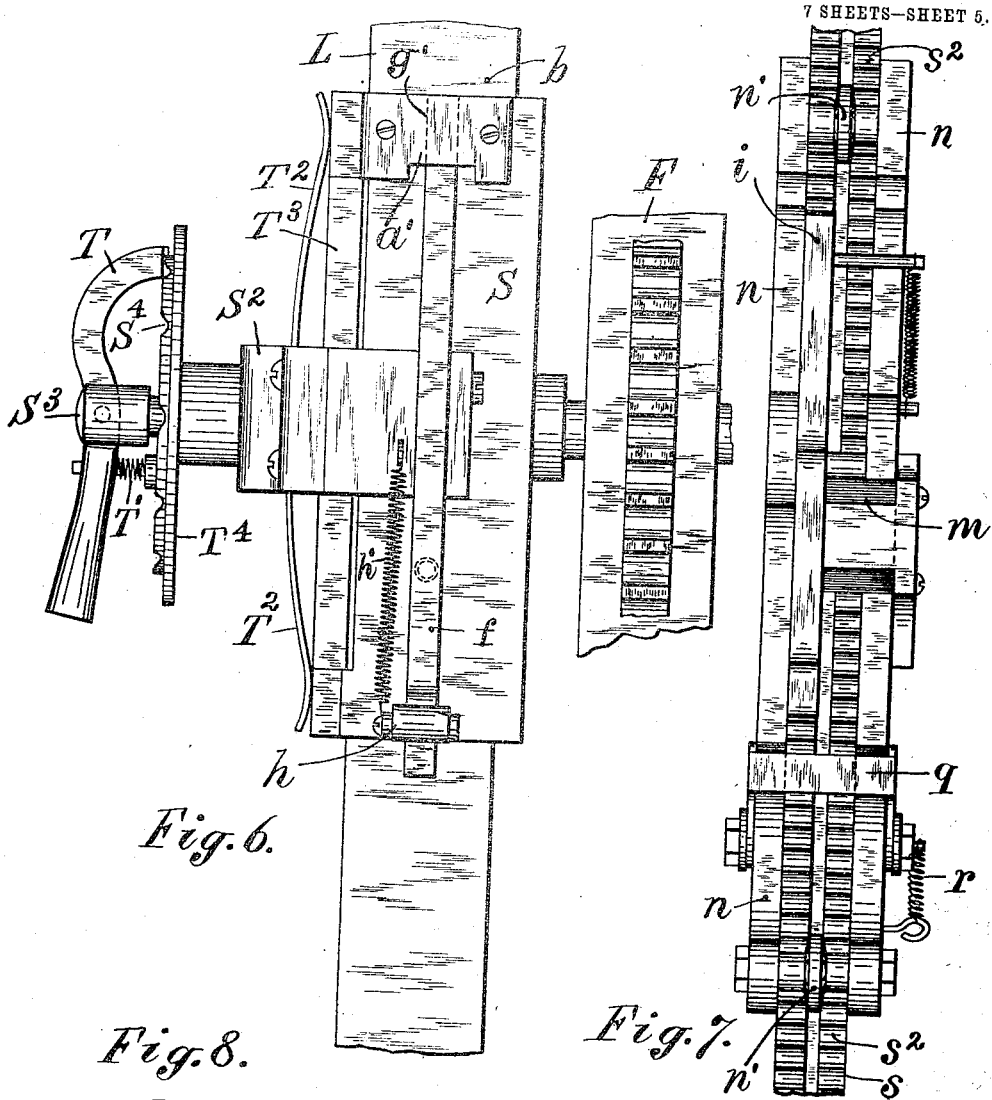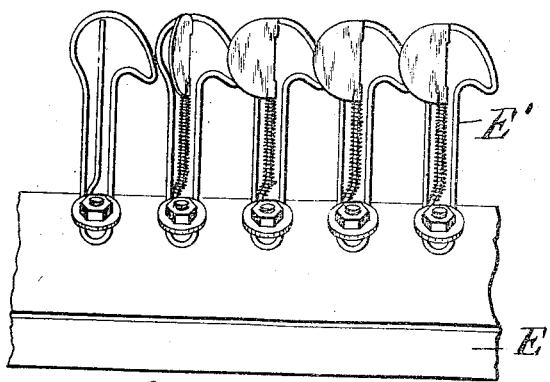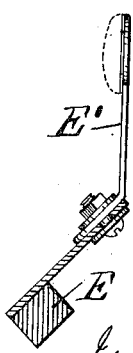

No. 840,933. PATENTED JAN. 8, 1907.
C. A. GONZENBACH.
EMBROIDERING MACHINE.
APPLICATION FILED APR. 28, 1906.
7 SHEETS—SHEET 6.
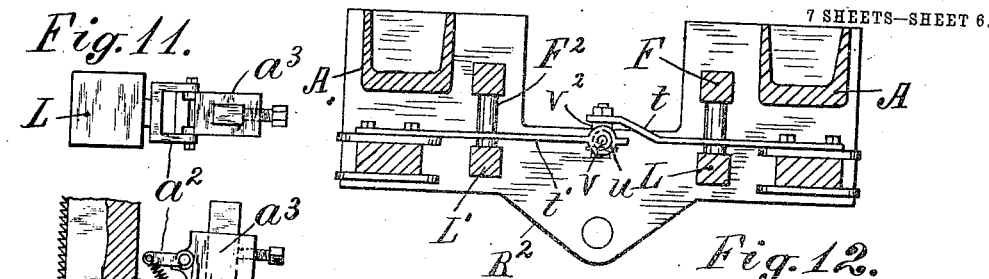
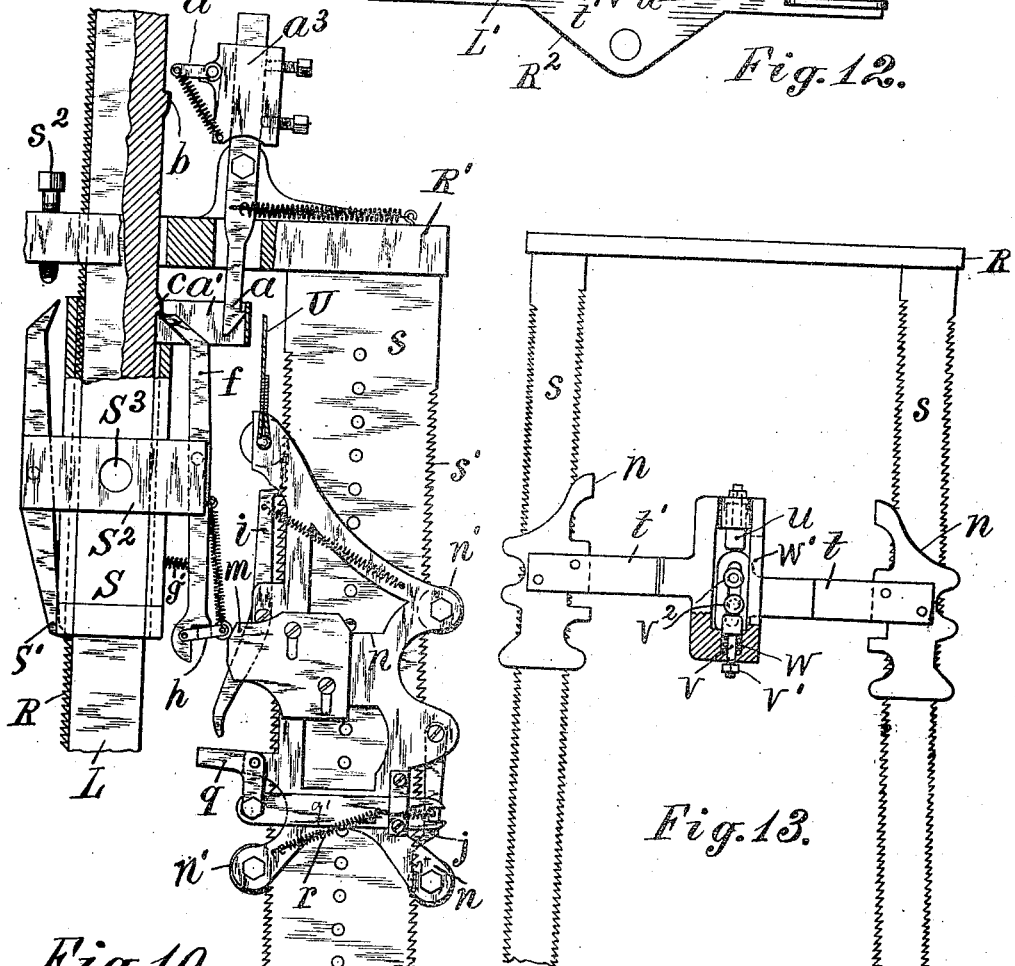
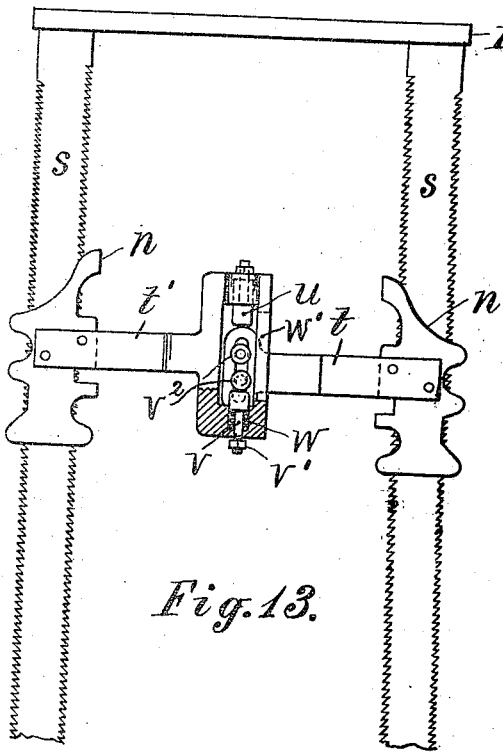
Witnesses:
L. Lee
Daism D. Purrington
Inventor.
Charles A. Gonzenbach, per
Thomas S. Crane, Atty

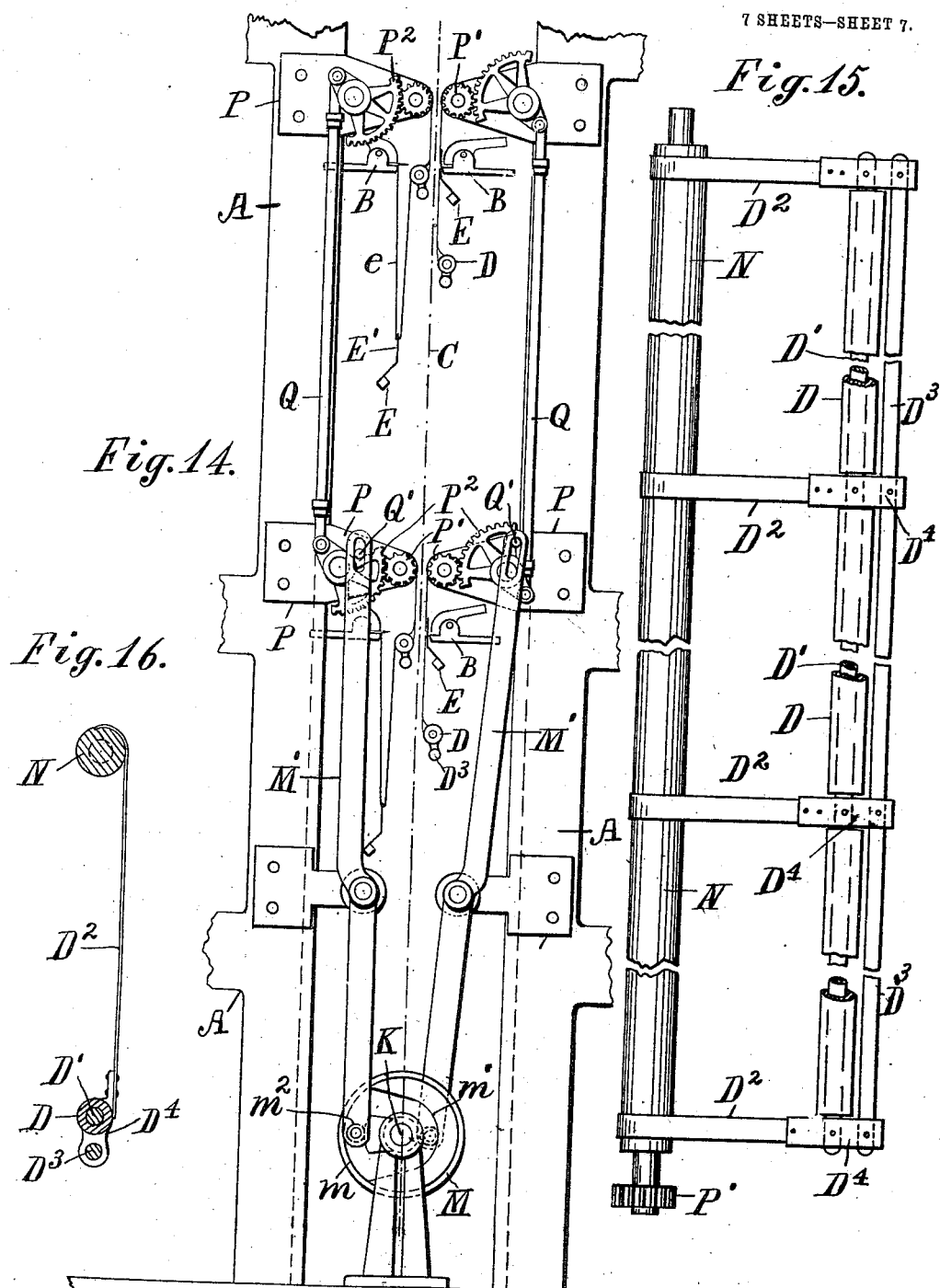

UNITED STATES PATENT OFFICE.

CHARLES A. GONZENBACH, OF WARREN, RHODE ISLAND.

EMBROIDERING-MACHINE.

No. 840,933.  Specification of Letters Patent.  Patented Jan. 8, 1907.

Application filed April 28, 1906. Serial No. 314,120.

*To all whom it may concern:*

Be it known that I, CHARLES A. GONZENBACH, a citizen of the United States, residing on Railroad street, Warren, county of Bristol, State of Rhode Island, have invented certain new and useful Improvements in Embroidering-Machines, fully described and represented in the following specification and the accompanying drawings, forming a part of the same.

The present invention relates to that class of automatic or power-actuated embroidering-machines in which a double-pointed needle is supplied with a thread of definite length and forced through the cloth from one side to the other, the slack of the thread after each movement being drawn up by so-called "take-up hooks." In such machines the cloth or fabric to be embroidered is held in a suitable frame and shifted by means of pantographic mechanism, so that the stitches may be disposed in the desired pattern upon the fabric It is obvious that where the needle is supplied with a thread of definite length the thread is shortened by the successive stitches, and the movement of the take-up hook must therefore be gradually diminished and accurately regulated to produce a uniform tension of the thread upon each stitch.

The present improvements comprise an improved form of thread-bar, improved means for raising and lowering the thread-bars upon the opposite sides of the fabric, and improvements in the take-up mechanism.

The invention will be understood by reference to the annexed drawings, in which—

Figure 1:
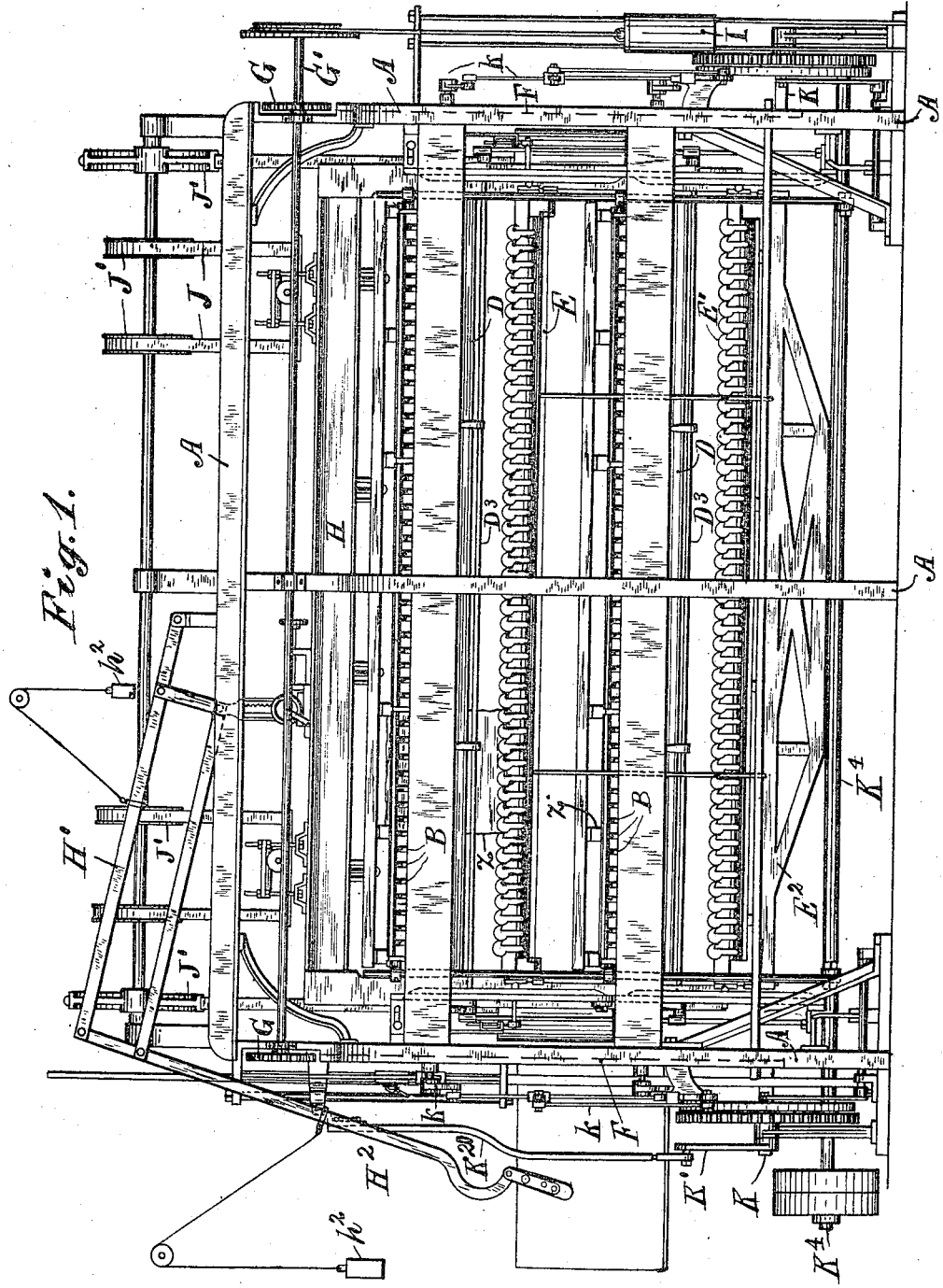
Figure 2:
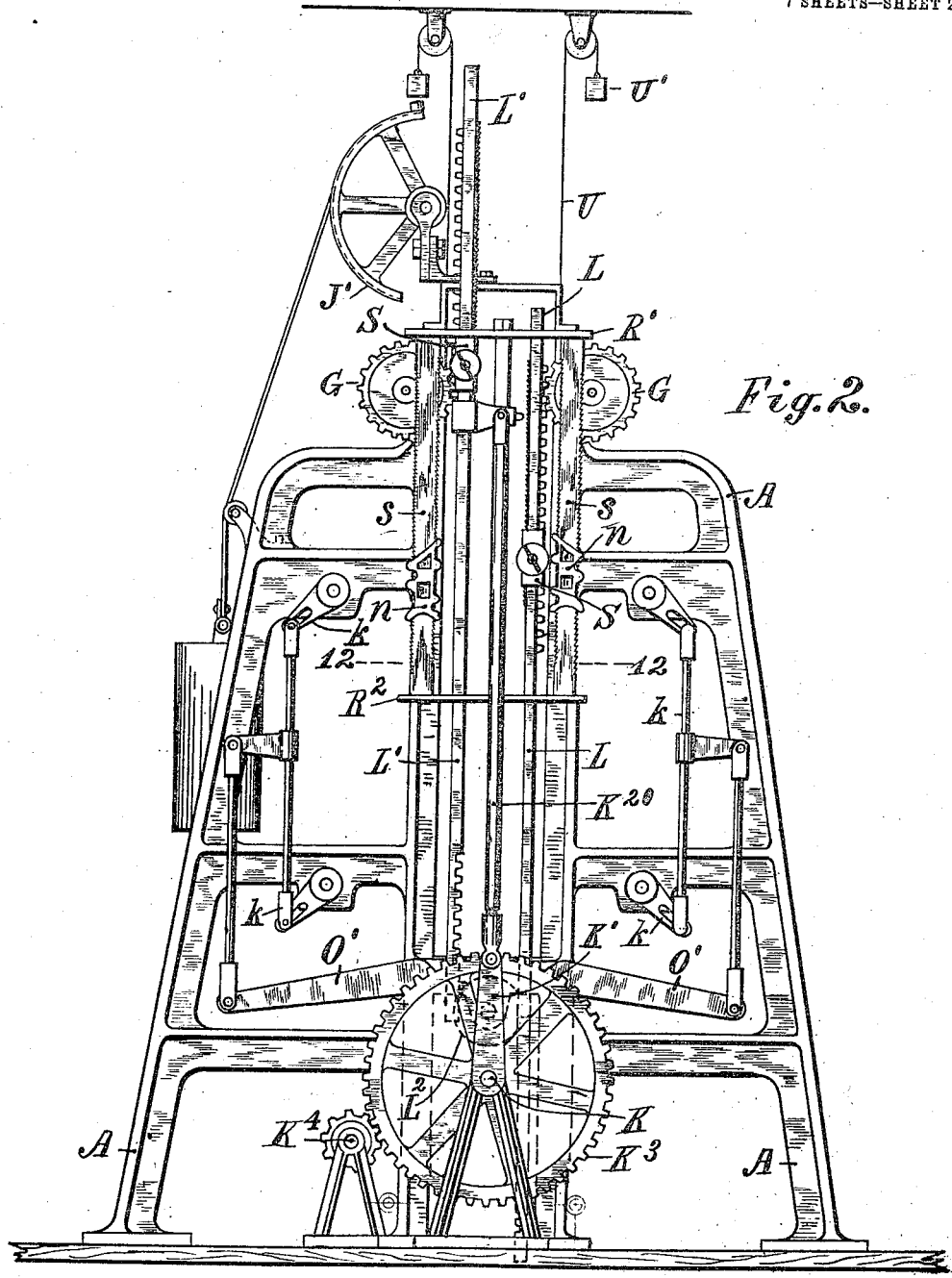
Figure 3:
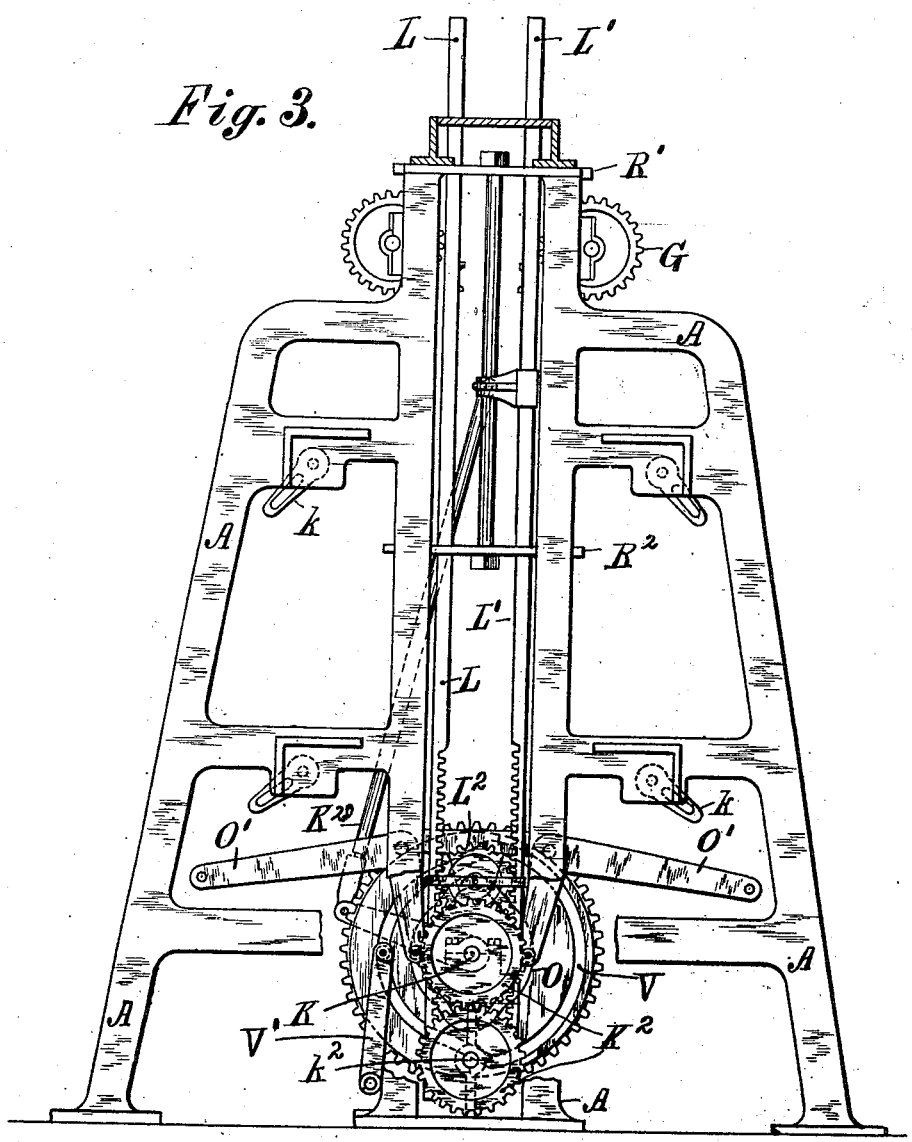

Figure 1 is a front elevation of a machine provided with the improvements. Fig. 2 is an elevation at the end of the machine provided with the take-up mechanism, many details being omitted on account of the smallness of the scale. Fig. 3 shows the inner side of the frame at the same end of the machine. Fig. 4 is an elevation of the slide-bar and ratchet-bar having the take-up mechanism thereon. Fig. 5 is a plan of the slide-bar and its attachments. Fig. 6 is an edge view of the slide-bar and its attachments; Fig. 7, an edge view of the ratchet-bar and its attachments. Fig. 8 is a front view of a portion of the take-up hooks, and Fig. 9 a section of the take-up hook-bar. Fig. 10 is an elevation of one of the slide-bars and ratchet-bars with the take-up mechanism and the head-bar upon the top of the main frame with latch pivoted thereon to sustain the slide, the parts being in section where hatched adjacent to such latch. Fig. 11 is a plan of the slide-bar and the said latch. Fig. 12 is a horizontal section of the ratchet-bars and slide-bars with the frame adjacent to the same, the view being taken on line 12 12 in Fig. 2 and drawn upon a larger scale. Fig. 13 is an elevation viewed from the inner side of the adjustable coupling between the take-up boxes. Fig. 14 is an elevation of the gearing to actuate the thread-bars. Fig. 15 is a side view of one of the thread-bars and its supporting means, such bars being disposed horizontally when in the machine; and Fig. 16 is a cross-section of the thread-bar and its supports.

I will first describe the mechanism ordinarily employed and then point out the particular improvements which are the subject of my invention.

A designates the frame of the machine, B the needle-carriers, which are reciprocated to and from the surface of the fabric, which is indicated by the dot-and-dash line C in Fig. 14.

The fabric, of which a specimen, like a handkerchief, is shown at $z$ in Fig. 1, is mounted in frames $z'$, carried by a hanger H, which is counterbalanced by straps J, pulley J', and a weight in the usual manner. The hanger H is actuated by a pantograph mechanism H' in the usual manner, the latter being balanced by cords and weights $h^2$. D indicates the thread-bars, which are raised to the level of the needle after the same has been drawn through the fabric, as shown at the left side of the fabric in this figure.

E represents the take-up bar having take-up hooks E'. (Shown in engagement with the loop or slack of the thread $e$ in Fig. 14.)

Vertical bars F are connected with the hook-bar E at their opposite ends, and in order to balance the weight of the hook-bars and these connecting-bars F the bars F are toothed near their upper ends, as shown in Fig. 2, to mesh with cog-wheels G, the shaft G' of which is counterbalanced by weight I in the usual manner, as shown in Fig. 1.

The vertical bars F are shown in Figs. 6 and 12 connected by studs $F^2$ with slides S upon the slide-bars L L'. The slide-bars L L' are reciprocated with a uniform throw alternately up and down by the following means: A pulley-shaft K⁴ in the bottom of the machine actuates a shaft K by gears K³, the shaft K carrying a crank K', which is connected by rod K²⁰ with the slide-bar L. The opposite slide-bar L' is actuated reversely by a gear-wheel L², which meshes with teeth upon both of the slide-bars, thus giving the slide-bars a uniform and alternate movement. The slide-bars L L' lie within vertical openings in the end frames A, and the gear-wheel L² is concealed from sight by the large gear K³ in the outer view of the frame shown in Fig. 2; but in the inner view of the frame shown in Fig. 3 the gear-wheel L² is visible, and the cross-bar of the frame at a level with the shaft K and the foot of the frame below the middle of such cross-bar are broken away to expose the parts that are both inside and outside of the frame.

The slides S have the usual frictional contact with the bars L L', so that the uniform stroke of the bars may impart a variable movement to the slides and to the hook-bars E under the control of the regulating devices, which will be hereinafter described.

The bars F are broken away in Fig. 1, where they extend upward past the cog-wheels G, so that the cog-wheels G may be exposed to view and their connection with the counterbalance-weight I.

The bars F are omitted in Fig. 3, as they would obscure the bars L L'. Gears K² are shown connecting the shaft K with a shaft which carries the cam M (shown in Fig. 14) for raising and lowering the thread-bars. Fig. 14 is on an enlarged scale.

No claim is made to the above mechanism, which has been described in order to make the application of my improvements intelligible.

The improved thread-bar mechanism is constructed as follows: In Fig. 3 a disk is shown carrying a cam O to operate the levers O', which are connected, as shown in Fig. 2, by parts k to the usual mechanism for moving the needle-carriers to and from the fabric. The disk also carries a cam V, which operates a lever V' to open and close the needle-clamps, which are indicated at B in Fig. 14. As the needle-operating mechanism forms no part of the present invention, the connections between the clamps and the lever V' are not shown herein, as they would greatly obscure the drawing. The cam M in Fig. 14 operates alternately levers M', which act upon pins Q' on toothed segments P², which raise and lower the thread-bars D.

Instead of using a rigid bar as a thread-bar I make the thread-bar with a movable or rotatable surface, so as to diminish the friction, and thus reduce the strain and wear of the thread as it passes over the thread-bar.

Each thread-bar consists of a series of sleeves D, mounted upon a common axle or rod D', which is suspended by straps D² on rolls N. The axle is stiffened by a brace-rod D³, which is tied thereto by links D⁴, as shown in Figs. 15 and 16. The links are attached to the straps D³, and the sleeves D extend along the rod or axle D' between the several links D⁴, and each sleeve is fitted to turn loosely upon the rod, so that it forms an antifriction support for the thread, which may turn readily upon the rod as the thread passes over the sleeve, and thus causing much less friction and wear than if the thread were dragged over the edge of a rigid bar.

The rolls N, as shown in Figs. 14 and 15, are journaled upon brackets P and are provided upon the end with gears P', which mesh into toothed segments P², journaled upon the said brackets. Two tiers of needle-carriers are shown to operate simultaneously upon two similar pieces of embroidery, and the thread-bars and take-up mechanism are duplicated for each of the tiers.

The toothed segments P² of the two tiers are connected by pivots to a link Q, and the upper ends of the levers M' are slotted and fitted to pins Q' upon the lower toothed segments to oscillate them through an arc of about ninety degrees when the levers are vibrated by the cam M. The cam is constructed with two concentric arcs $m$ and $m'$, in each of which the roller $m^2$ upon one of the levers M' dwells during the operation of the take-up hooks and then raises the thread-bar upon one side of the fabric and lowers the other thread-bar upon the opposite side, as required.

The inner side of each slide-bar L is formed for a certain space with upwardly-inclined rack-teeth R, and each bar slides through a head-piece R' and a foot-piece R² fixed upon the frame A. A slide S is fitted to the slide-bar and provided with the usual dog S' to engage the teeth R upon the slide-bar, being released from the teeth at the upper end of its movement by a screw-pin $s^2$ in the usual manner, as shown in Fig. 10. A bridge S² upon the slide forms a bearing for a screw S³ (see Figs. 4, 5, and 6) and carries a dial having notches S⁴. A finger T is formed upon an index-arm upon the head of the screw and is pressed into the notches S⁴ by a spring T', as shown in Fig. 6. A leaf-spring T² is fitted between the point of the screw and a gib T³ in the outer face of the slide, the screw pressing the gib elastically upon the slide-bar to regulate its frictional engagement therewith. Each slide is carried upwardly to the same point at each stroke of the slide-bar, thus raising the take-up hooks E' above the needles, as shown at the right-hand side of the fabric C in Fig. 14, and when the thread is drawn beneath the hooks the hook-bar is carried downward by the slide-bar and slide until the slide is arrested by the regulator mechanism. The downward movement of the slide-bar L is imparted to the slide S by the engagement of a tooth $c$ upon the slide with the point $g$ of a dog $f$, pivoted upon the slide, a spring $g'$ pressing the point normally against the slide-bar to engage the tooth. The dog is tripped or its position shifted by the regulating devices when the tension of the threads upon the take-up hooks offers a certain predetermined resistance to the take-up regulating mechanism.

*Take-up regulator.*—The take-up regulator comprises the stationary ratchet-bar $s$, having teeth $s'$ and $s^2$, inclined upwardly and downwardly upon its opposite edges, and the sliding box $n$, arranged to arrest the slide when the desired thread-tension is reached. The take-up regulator is required at only one end of the machine, as the hook-bars E are united at their opposite ends by the vertical bars F, and these bars at both ends of the machine are moved up and down simultaneously by their engagement with the cog-wheels G, the shaft G' of which extends the whole length of the machine and turns all the cog-wheels simultaneously, and thus raises and lowers both ends of the hook-bars uniformly. The hook-bars thus maintain their horizontal position in all their movements, and the take-up regulator which operates upon the vertical bars F at one end of the machine thus operates effectively to regulate the movement of the hook-bars.

A cord U is shown in Figs. 4 and 10 attached to the box $n$, and the cord carried over a pulley and supplied with a weight U', as shown in Fig. 2, which tends to carry the box upward when the pawl $i$ is released, such upward force opposing the downward momentum of the slide to arrest the same when the desired tension is reached.

One of the ratchet-bars $s$ is arranged outside of each of the slide-bars L, as shown in Fig. 2, and its sliding box $n$ is provided with an upwardly-projecting pawl $i$ and a downwardly-projecting pawl $j$, fitted, respectively, to the teeth $s^2$ and $s'$ upon the ratchet-bar. A bell-crank $q$ is connected with the lower pawl $j$ by a link $q'$ and has an arm projecting below the tail of the pawl $i$. Springs press these pawls normally into the teeth, and a spring $r$ presses the outer arm of the bell-crank normally upward against the tail of the pawl $i$, and the tail of the pawl has an incline by which the dog $f$ upon the slide S can detach the pawl to permit the upward movement of the box by the weight U and then engage the bell-crank $q$, such latter engagement operating first to press the pawl $j$ away from the teeth $s^2$ and, second, to push the box and hook-bar downwardly.

The regulator would not arrest the slide S unless the slide was detached from the slide-bar L, and such detachment is effected by an adjustable seat $m$, attached to the box $n$ in the path of the hinged contact-piece $h$ and operating against the contact-piece to press the tail of the dog backwardly at one end and withdraw the dog $f$ from the tooth $c$. The contact-piece is hinged to clear the seat $m$ upon the reverse movement of the slide, and a spring $h'$ is provided to hold the contact-piece normally in an operative position. When in this position, the contact-piece rests upon a shoulder near the bottom of the dog $f$, and thus presses forcibly against the bell-crank $q$ when moving downward, thus withdrawing the pawl $j$ from the ratchet-bar $s$ and permitting the slide to carry the box $n$ downwardly until the resistance of the weight U' has stopped the slide and arrested the hook-bars under the desired tension. The boxes $n$ are in practice carried upward by the weight U' (after making each stitch) an amount equal to the thread taken up in the stitch, thus advancing gradually from the lower to the upper part of the ratchet-bar $s$. It assists materially in maintaining a uniform tension upon the thread when drawn out of both sides of the fabric to connect the two boxes $n$ by a device which permits a limited movement to each independent of the other, such movement being, however, sufficient to take up the slack after a single stitch. A device for this purpose is shown in Figs. 12 and 13, each of the boxes having an arm $t$ or $t'$ bolted thereto and one of the arms provided with contact-blocks to engage studs $v^2$ upon the other arm. Such contact-blocks $u$ are shown as spring-pins having shanks $v$ fitted to sockets upon the arm $t'$ and pressed normally toward one another by a spring $w$ in each socket. Nuts $v'$ are shown upon the shanks to limit the inward movement. The arm $t$ is shown provided with a transverse slot in the end with two studs $v^2$ clamped therein, which permits their adjustment to vary the movement between the spring-pins, and the space between the blocks or studs $u$ is sufficient to permit the required movement. The springs bring either of the boxes $n$ to rest without any shock. The nuts $v$ are also adjustable on the shanks $v$ to vary the point of impact and the extent of either box's movement.

Having thus set forth the nature of the invention, what is claimed herein is—

1. In an embroidering-machine, a thread-bar having a stationary axle with a sleeve rotatable thereon to diminish its friction with the thread, in combination with means for raising and lowering the axle and the sleeve as required.

2. In an embroidering-machine, a thread-bar consisting of the axle D', links for supporting the axle at intervals along its length, sleeves D fitted to turn loosely upon the axle between the links, and means for suspending and operating the links to raise and lower the thread-bar as required.

3. In an embroidering-machine, the means for raising and lowering thread-bars upon opposite sides of the fabric, consisting of the straps D², the rolls N upon opposite sides of the fabric, pinions P' upon the ends of the rolls, segments P² for turning the pinions, and a cam with connections for oscillating the segments alternately in opposite directions.

4. In an embroidering-machine, the means for raising and lowering thread-bars upon opposite sides of the fabric, consisting of the straps D², the rolls N upon opposite sides of the fabric, pinions P' upon the ends of the rolls, segments P² for turning the pinions, levers having one end connected to the respective segments, and a cam connected with the opposite ends of the levers to move them reversely, substantially as set forth.

5. In an embroidering-machine, the means for raising and lowering the thread-bars for two tiers of needles, consisting of the straps D², the rolls N upon opposite sides of the fabric above the level of the needles, pinions P' upon the ends of the rolls, segments P² for turning the pinions, links connecting the two tiers of segments, and means for reversely operating the segments of the lower tier, substantially as set forth.

6. The combination, with the take-up hook-bar having a bar F at each end with teeth upon its upper end, of a shaft G' carrying cog-wheels G meshing with said teeth, a reciprocating slide-bar L having a slide S movable therewith and connected by stud F² to one of the bars F, a vertical ratchet-bar s having the box n fitted movably thereon, the weight U' connected with such box, the pawls I and J upon such box operating oppositely upon the edges of the ratchet-bar, and the slide S provided with the dog f for operating successively upon the pawls I and J, as herein set forth.

7. In an embroidering-machine, the combination, with a take-up hook-bar, of the vertical ratchet-bar s, the box n fitted to such ratchet-bar and movable with the weight U', and having the pawls i and j operating oppositely upon the edges of the ratchet-bar, the crank q below the latch i for operating the pawl j, and the reciprocating slide-bar L having slide S movable therewith and connected to the hook-bar, and provided with the dog f having a hinged contact-piece h to operate successively upon the pawl i and the crank q, so as to first release the box for upward movement and then push it downward by the momentum of the slide S.

8. In an embroidering-machine, the combination, with a take-up hook-bar, of the vertical ratchet-bar s, the box n fitted to such ratchet-bar and movable with the hook-bar, the pawls i and j upon the box n operating oppositely upon the edges of the ratchet-bar, the crank q upon the box with connections to the pawl j, and the seat m upon the box adjacent to the tail of the latch i, the reciprocating slide-bar L provided with the tooth c, the slide S movable thereon and provided with the dog f to engage the tooth, and the dog f having the hinged contact-piece h arranged to contact first with the seat m to release the dog f from the slide-bar L, and to then operate successively upon the pawl i and crank q so as to first release the box for upward movement and then push it downward by the momentum of the slide S.

9. In an embroidering-machine, the combination, with a take-up hook-bar, of the vertical ratchet-bar s, the box n fitted to such ratchet-bar and movable with the hook-bar, the pawls i and j upon the box n operating oppositely upon the edges of the ratchet-bar at the upper and lower ends of the box respectively, the crank q pivoted upon the box with horizontal arm below the tail of the pawl i and connected to the pawl j, the seat m mounted adjustably upon the box and projected adjacent to the tail of the pawl i, and a reciprocating slide S having a dog with contact-piece operating successively upon the seat, the pawl i and the crank q, as and for the purpose set forth.

10. In an embroidering-machine, the combination, with a take-up hook-bar, of the vertical ratchet-bar s fitted to a head-piece R', the box n fitted to such ratchet-bar and movable with the hook-bar, the pawl i and j operating oppositely on the edges of the ratchet-bar, the reciprocating slide-bar L movable through the head-piece R', and having the teeth b and c as set forth, the slide S movable upon the slide-bar and having the dog f to engage the tooth b and a socket a' at its upper end, the latch a pivoted upon the head-piece to engage the socket a', and having an arm a² extended in the path of the tooth b, whereby the slide is supported by the pawl a during the passage of the needles through the fabric, and is released by the tooth b before the tooth c encounters the dog f, the said dog having a contact-piece to operate successively upon the pawls i and j upon the box.

11. In an embroidering-machine, the combination, with the slide-bar L having the teeth b and c as set forth, the slide S movable thereon having the socket a' at the upper end and provided with the dog f having contact-piece to operate upon the take-up mechanism, of a head-piece R' to guide the slide-bar, the latch a pivoted upon the head-piece to engage the socket a' and having its tail provided with the adjustable block a³, and the spring-arm a² movable upwardly thereon and projected in the path of the tooth b upon the slide-bar, whereby the slide-bar carries the slide to its highest position where it is held by the latch a during the movement of the needles through the fabric, and the latch then detached by the tooth b and the slide engaged by the tooth c to operate upon the take-up mechanism, as and for the purpose set forth.

12. In an embroidering-machine, the combination, with take-up hook-bars operating upon opposite sides of the fabric, of a vertical ratchet-bar s for each of the hook-bars, the boxes n fitted movably to such ratchet-bars and movable with the hook-bar and provided with pawls i and j as set forth, reversely-reciprocating slide-bars L, L', each carrying a dog f to operate upon the latches of one of the boxes, and a loose coupling mechanism connecting the boxes and permitting only a short movement of either box upon its ratchet-bar independently of the other box.

13. In an embroidering-machine, the combination, with take-up hook-bars operating upon opposite sides of the fabric, of a vertical ratchet-bar s for each of the hook-bars, the boxes n fitted movably to such ratchet-bars and movable each with a weight U', and provided with pawls i and j as set forth, reversely-reciprocating slide-bars L, L', each carrying a dog f to operate upon the pawls of one of the boxes, and a coupler formed of rigid arms and projected from the boxes and having an adjustable connection intermediate to the boxes, permitting only a short and adjustable movement of either box upon its ratchet-bar independently of the other box.

14. In an embroidering-machine, the combination, with take-up hook-bars operating upon opposite sides of the fabric, of a vertical ratchet-bar s for each of the hook-bars, the boxes n fitted movably to such ratchet-bars and movable each with a weight U', and provided with pawls i and j as set forth, reversely-reciprocating slide-bars L, L', each carrying a dog f to operate upon the pawls of one of the boxes, and a coupler formed of rigid arms projected from the boxes, one of such arms carrying spring-pins and the other arm movable between such studs permitting a short movement of either box upon its ratchet-bar independently of the other box.

15. In an embroidering-machine, the combination, with the slide-bar L, of the slide S movable thereon and provided with the dog f having contact-piece to operate upon the pawls of the take-up mechanism, and having the leaf-spring $T^2$ with screw to press the same toward the slide-bar, the notched dial $T^4$ upon the bearing of the screw, and the index-arm movable with the screw and having finger T with spring T' to press it into the notches of the dial, to hold the screw when adjusted.

In testimony whereof I have hereunto set my hand in the presence of two subscribing witnesses.

CHARLES A. GONZENBACH.

Witnesses:
L. LEE,
THOMAS S. CRANE.